(12) United States Patent
Hart

(10) Patent No.: US 10,106,197 B2
(45) Date of Patent: Oct. 23, 2018

(54) DEVICE AND ASSEMBLY FOR PROTECTING A FRONT END MODULE OF A MOTOR VEHICLE

(71) Applicant: FORD GLOBAL TECHNOLOGIES, LLC, Dearborn, MI (US)

(72) Inventor: John Henry Hart, Clinton Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/452,247

(22) Filed: Mar. 7, 2017

(65) Prior Publication Data
US 2018/0257712 A1    Sep. 13, 2018

(51) Int. Cl.
| B62D 21/15 | (2006.01) |
| B62D 25/08 | (2006.01) |
| B60R 19/24 | (2006.01) |

(52) U.S. Cl.
CPC ............ B62D 21/155 (2013.01); B60R 19/24 (2013.01); B62D 25/085 (2013.01)

(58) Field of Classification Search
CPC ......... B60R 19/24; B60R 19/44; B60R 19/48; B60R 19/52; B60R 2019/525; B60R 2019/527; B62D 21/152; B62D 21/155; B62D 21/085
USPC ........................ 296/187.09, 193.09, 203.02
See application file for complete search history.

(56) References Cited

U.S. PATENT DOCUMENTS

| 6,155,633 | A | * | 12/2000 | Minami | ............... | B62D 21/152 |
| | | | | | | 293/115 |
| 6,193,274 | B1 | * | 2/2001 | Brown | ................... | B62D 21/11 |
| | | | | | | 280/784 |
| 6,227,321 | B1 | | 5/2001 | Frascaroli et al. | | |
| 6,450,276 | B1 | * | 9/2002 | Latcau | ................. | B62D 25/084 |
| | | | | | | 180/68.1 |
| 6,814,400 | B2 | | 11/2004 | Henderson et al. | | |
| 6,869,131 | B2 | | 3/2005 | Kafuku et al. | | |
| 7,681,700 | B2 | * | 3/2010 | Ginja | ..................... | B60R 19/18 |
| | | | | | | 188/371 |
| 9,254,801 | B2 | | 2/2016 | Sogabe et al. | | |
| 2004/0041439 | A1 | * | 3/2004 | Kafuku | ............... | B62D 25/084 |
| | | | | | | 296/193.09 |
| 2004/0195864 | A1 | * | 10/2004 | Shibata | ................... | B60R 19/24 |
| | | | | | | 296/203.02 |
| 2005/0067860 | A1 | * | 3/2005 | Makita | ..................... | B60R 19/24 |
| | | | | | | 296/203.02 |
| 2009/0058135 | A1 | * | 3/2009 | Murata | .................. | B62D 21/11 |
| | | | | | | 296/187.09 |
| 2011/0156414 | A1 | * | 6/2011 | Gonin | ..................... | B60R 19/12 |
| | | | | | | 293/132 |

(Continued)

FOREIGN PATENT DOCUMENTS

CN    202863118 U    4/2013

OTHER PUBLICATIONS

English Machine Translation of CN202863118U.

*Primary Examiner* — Gregory A Blankenship
(74) *Attorney, Agent, or Firm* — Jason Rogers; King & Schickli, PLLC

(57) ABSTRACT

A protection assembly for a front end module of a motor vehicle includes a bumper beam, a subframe and a protection device bridging between the bumper beam and the subframe. A method of protecting a front end module of a motor vehicle is also provided.

17 Claims, 4 Drawing Sheets

(56) References Cited

U.S. PATENT DOCUMENTS

| | | | | |
|---|---|---|---|---|
| 2011/0266785 A1* | 11/2011 | Mildner | ............... | B62D 21/11 |
| | | | | 280/785 |
| 2012/0187720 A1* | 7/2012 | Tomozawa | ........... | B62D 21/155 |
| | | | | 296/187.09 |
| 2012/0187724 A1* | 7/2012 | Tomozawa | ............ | B62D 21/11 |
| | | | | 296/193.09 |
| 2012/0248820 A1* | 10/2012 | Yasui | ...................... | B60R 19/34 |
| | | | | 296/187.09 |
| 2013/0207417 A1* | 8/2013 | Kihara | ................... | B60R 19/34 |
| | | | | 296/187.09 |
| 2014/0152051 A1* | 6/2014 | Saitou | ................... | B62D 21/15 |
| | | | | 296/187.09 |
| 2015/0251613 A1* | 9/2015 | Mori | ...................... | B60R 19/18 |
| | | | | 296/187.09 |
| 2016/0046250 A1* | 2/2016 | Sotoyama | ........... | B62D 21/152 |
| | | | | 293/155 |
| 2016/0375936 A1* | 12/2016 | Yalamanchili | ....... | B62D 21/152 |
| | | | | 296/203.01 |
| 2017/0029038 A1* | 2/2017 | Sato | ................... | B62D 25/2018 |
| 2017/0259853 A1* | 9/2017 | Leanza | ............... | B62D 21/155 |

* cited by examiner

DEVICE AND ASSEMBLY FOR PROTECTING A FRONT END MODULE OF A MOTOR VEHICLE

TECHNICAL FIELD

This document relates generally to the motor vehicle equipment field and, more particularly, to a protection device, a protection assembly and a method of protecting a front end module of a motor vehicle from sustaining damage during mild off-road events.

BACKGROUND

The front end module (FEM) of a motor vehicle includes a housing holding critical cooling components such as a radiator, an air conditioning condenser, a transmission oil cooler and a turbocharger intercooler of a motor vehicle. Many motor vehicles such as pickup trucks and sport utility vehicles may be utilized off road where rough terrain could potentially damage critical cooling components of the FEM.

This document relates to a new and improved protection device and protection assembly as well as to a method of protecting critical cooling components of an FEM of a motor vehicle from sustaining damage from mild off-road events such as may be anticipated by the user of a motor vehicle.

SUMMARY

In accordance with the purposes and benefits described herein, a new and improved protection device is provided for a front end module (FEM) of a motor vehicle. That protection device comprises a body having a first bumper beam engagement feature, a second bumper beam engagement feature, a first subframe engagement feature and a second sub-frame engagement feature whereby the body bridges the subframe and the bumper beam and protects the FEM.

The body may include a U-shaped section having the first bumper beam engagement feature at a first end and the second bumper beam feature at a second end. The U-shaped section may also include a first bend, a second bend and an intermediate subsection between the first bend and the second bend.

Still further, the body may include a first lug projecting from the U-shaped section adjacent the first bend. That first lug may include the first subframe engagement feature at a first distal end thereof. Further, the body may include a second lug projecting from the U-shaped section adjacent the second bend. That second lug may include the second subframe engagement feature at a second distal end thereof.

In accordance with yet another aspect, a protection assembly is provided for a FEM of a motor vehicle. That protection assembly comprises a bumper beam, a subframe and a protection device. That protection device bridges between the bumper beam and the subframe. As a result of its geometry, the protection assembly extends at least partially around the FEM thereby functioning to protect the FEM from obstacles that might be encountered during a mild off-road driving event.

The protection device may include a body having a first bumper beam engagement feature connected to the bumper beam, a second bumper beam engagement feature connected to the bumper beam, a first subframe engagement feature connected to the subframe and a second subframe engagement feature connected to the subframe.

The body may include a U-shaped section having the first bumper beam engagement feature at a first end thereof and the second bumper beam engagement feature at a second end thereof. The U-shaped section may also include a first bend, a second bend, and an intermediate subsection between the first bend and the second bend.

The body may include a first lug projecting from the intermediate subsection adjacent the first bend. The first lug may include the first subframe engagement feature at a first distal end thereof.

The body may include a second lug projecting from the intermediate subsection adjacent the second bend. The second lug may include the second subframe engagement feature at a second distal end thereof. In addition, the subframe may include a first boss engaging the first subframe engagement feature and a second boss engaging the second subframe engagement feature.

In accordance with yet another aspect, a method is provided for protecting a FEM of a motor vehicle. That method may be broadly described as including a step of shielding the FEM with a protection assembly including a bumper beam, a subframe and a protection device bridging between the bumper beam and the subframe.

The method may further include the step of providing two connection points between the bumper beam and the protection device. Further, the method may include providing two additional connection points between the subframe and the protection device. In addition, the method may include the step of providing the two additional connection points inboard of the two connection points.

In the following description, there are shown and described several preferred embodiments of the protection device, the protection assembly incorporating the protection device and the related method of protecting a FEM of a motor vehicle. As it should be realized, the protection device, the protection assembly and the method are capable of other, different embodiments and their several details are capable of modification in various, obvious aspects all without departing from the protection device, protection assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the protection device, the protection assembly and the related protection method and together with the description serve to explain certain principles thereof.

Reference will now be made in detail to the present preferred embodiments of the protection device, protection assembly and method, examples of which are illustrated in the accompanying drawing figures.

DETAILED DESCRIPTION

Figure 1:
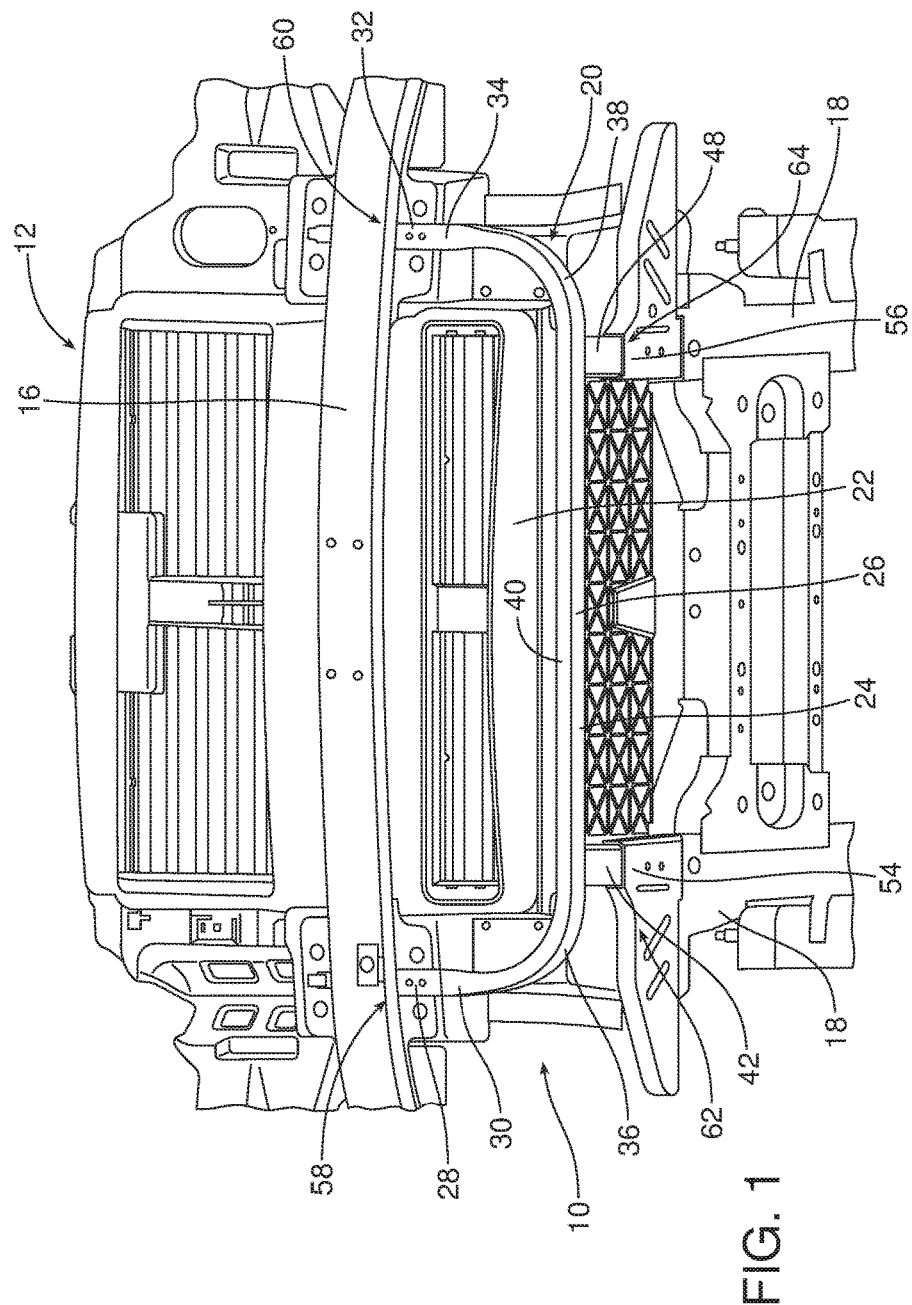
FIG. 1 is a front perspective view of the protection assembly, including the protection device, which illustrates how that protection assembly partially encompasses and protects the housing of a front end module of a motor vehicle.
Figure 2:
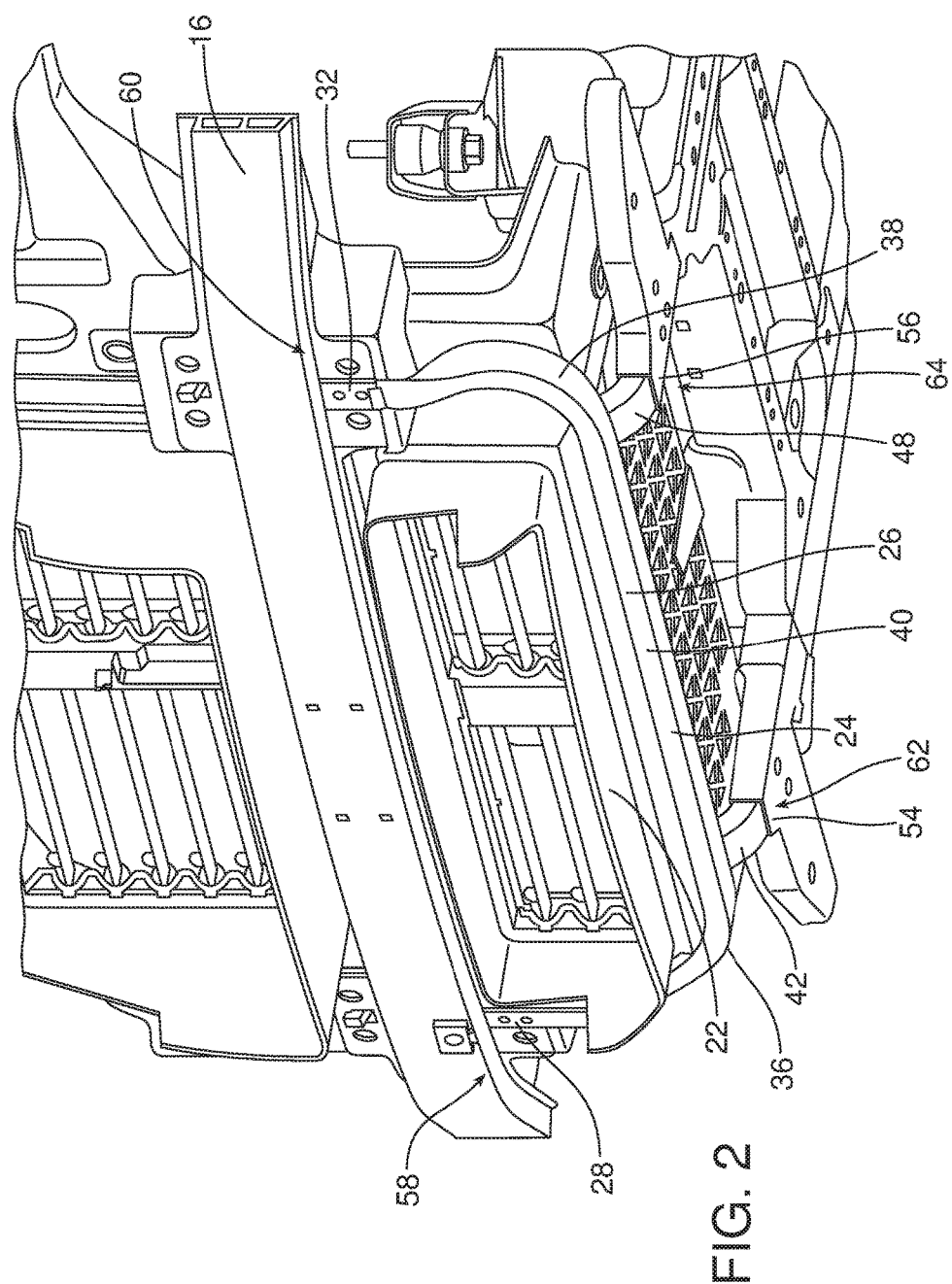
FIG. 2 is a left front perspective view of the structures illustrated in FIG. 1.
Figure 3:
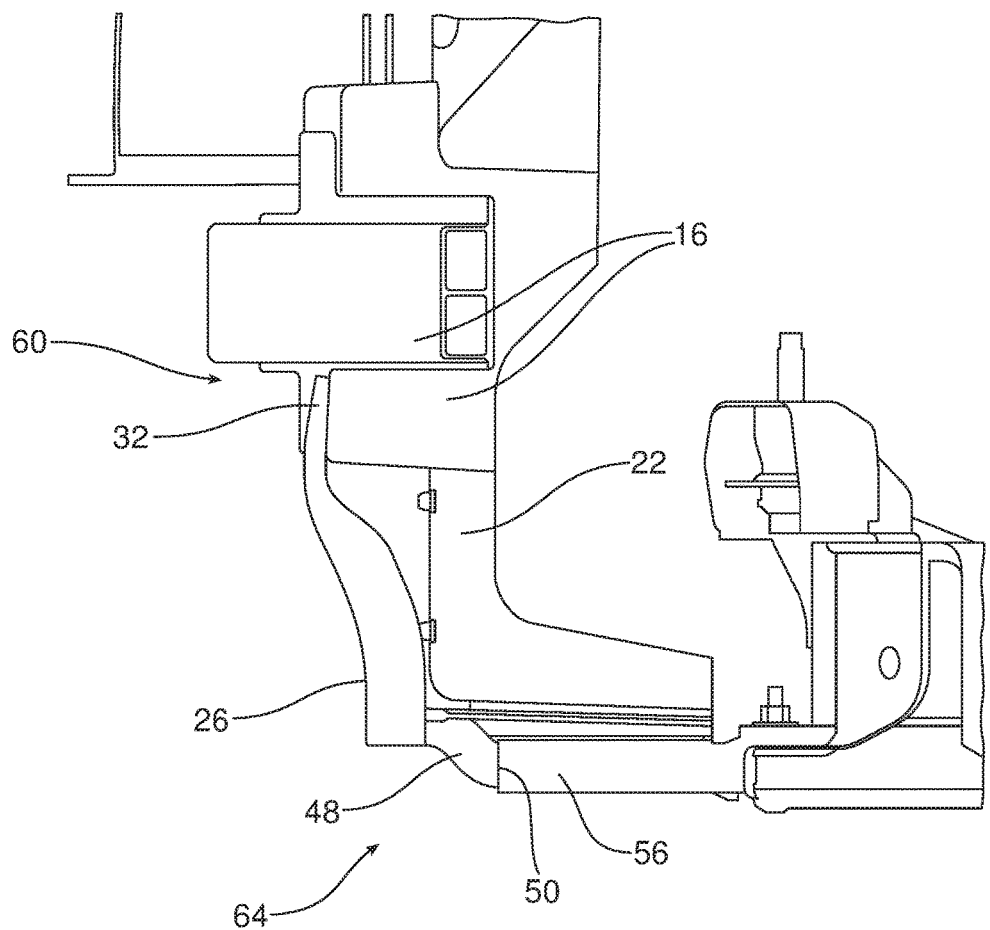
FIG. 3 is a left side elevational view of the structures illustrated in FIGS. 1 and 2.
Figure 4:
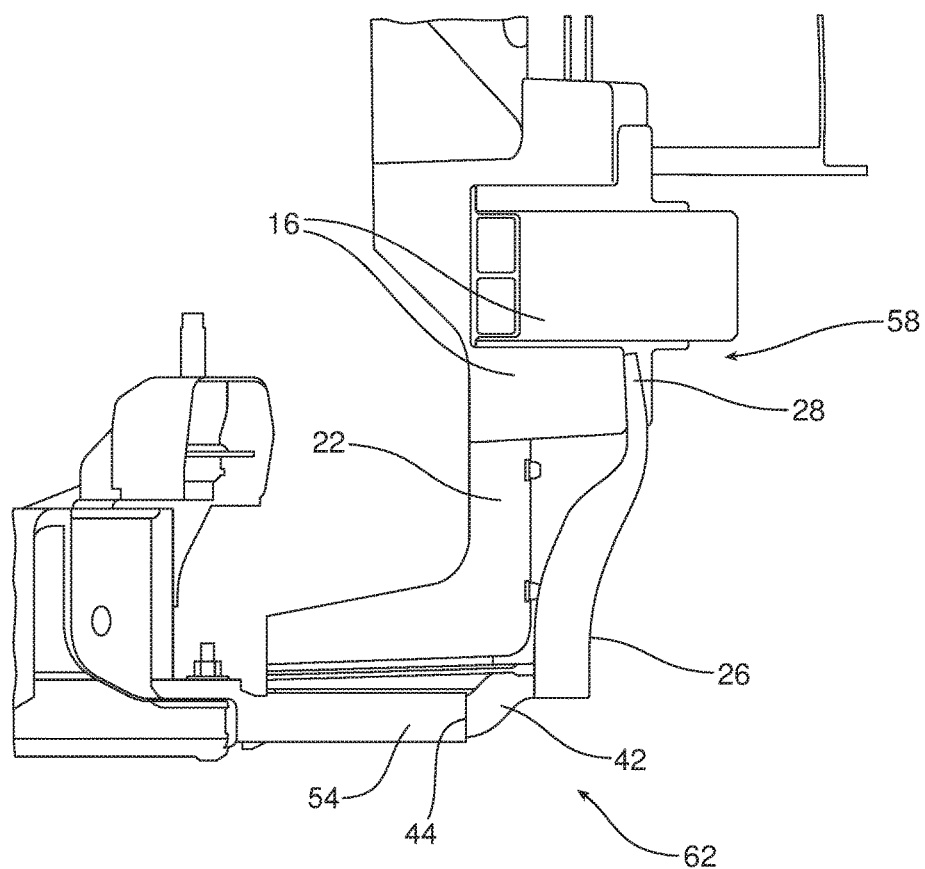
FIG. 4 is a right side elevational view of the structures illustrated in FIGS. 1 and 2.

Reference is now made to FIGS. 1-3 illustrating a new and improved protection assembly 10 for a front end module (FEM) 12 of a motor vehicle. That protection assembly 10 includes a bumper beam 16, a subframe 18 and a novel protection device 20. As illustrated in the accompanying drawing figures, that protection device 20 bridges between the bumper beam 16 and the subframe 18 so that the protection assembly 10 extends at least partially around the housing 22 of the FEM 12.

As illustrated in the drawing figures, the protection device 20 includes a body 24 made of a high strength material such as steel or aluminum. In the illustrated embodiment, the body 24 includes a U-shaped section 26. A first bumper beam engagement feature 28 is provided at a first end 30 of the U-shaped section 26. Similarly, a second bumper beam engagement feature 32 is provided at a second end 34 of the U-shaped section 26.

As further illustrated, the U-shaped section 26 includes a first bend 36, a second bend 38 and an intermediate subsection 40 between the first bend and the second bend. The body 24 also includes a first lug 42 projecting from the U-shaped section 26 and, more particularly, the intermediate subsection 40 adjacent the first bend 36. That first lug 42 forms an S-curve and includes a first subframe engagement feature 44 at a first distal end of the first lug.

The body 24 also includes a second lug 48 projecting from the U-shaped section 26 and, more particularly, the intermediate subsection 40 adjacent the second bend 38. The second lug 48 forms another S-curve and includes a second subframe engagement feature 50 at a second distal end of the second lug.

As also illustrated in the drawing figures the subframe 18 includes a first boss 54 and a second boss 56.

In the illustrated embodiment, the protection device 20 is connected to the bumper beam 16 at two connection points 58, 60 where the first bumper beam engagement feature 28 and the second bumper beam engagement feature 32 engage the bumper beam. The connection between the first and second bumper beam engagement features 28, 32 and the bumper beam 16 at the two connection points 58, 60 may be made by any appropriate means known in the art including fasteners such as cooperating nuts and bolts or rivets or fastening processes such as welding. The protection device 20 is connected to the subframe 18 at two additional connection points 62, 64 where the first subframe engagement feature 44 engages the first boss 54 and the second subframe engagement feature 50 engages the second boss 56. The two additional connection points 62, 64 between the protection device 20 and the subframe 18 are provided inboard of the two connection points 58, 60 between the protection device and the bumper beam 16 on the body 24 of the protection device. The two additional connection points 62, 64 may be secured by any means appropriate including, for example, mechanical fasteners such as cooperating nuts and bolts or rivets or mechanical processes such as welding.

As should be appreciated from the drawing figures, the first lug 42 and the second lug 48 of the body 24 of the protection device 20 are aligned with the respective first boss 54 and second boss 56 of the subframe 18 in order to provide an excellent load path for maximum strength in resisting impact damage should an object engage the protection device 20 during an off-road event or other occurrence. The two connection points 58, 60 between the protection device 20 and the bumper beam 16 further strengthen the protection device 20 against impact damage with the entire protection assembly 10 effectively forming a "protection cage" around the lower forward portion of the FEM housing 22.

As should be appreciated, the protection device 20 is relatively easy and inexpensive to produce. The protection device 20 may also be easily connected to the bumper beam 16 and subframe 18 to provide the protection assembly 10 having an enhanced ability to protect the FEM 12 including the FEM housing 22 from damage during off roading or at other times.

Consistent with the above description, a method is provided of protecting a front end module 12 of a motor vehicle 14. That method may be broadly described as comprising a step of shielding the FEM 12 with a protection assembly 10 including a bumper beam 16, a subframe 18 and a protection device 20 bridging between the bumper beam and the subframe.

As illustrated in the drawing figures and described above, the method also includes providing two connection points 58, 60 between the bumper beam 16 and the protection device 20. Further, the method includes providing two additional connection points 62, 64 between the subframe 18 and the protection device 20. Further, as best illustrated in FIG. 1, the two additional connection points 62, 64 are provided inboard the two connection points 58, 60 on the protection device 20.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A protection device for a front end module of a motor vehicle including a bumper beam and a subframe, comprising:
    a body having a first bumper beam engagement feature connected to the bumper beam at a first connection point, a second bumper beam engagement feature connected to the bumper beam at a second connection point, a first subframe engagement feature connected to the subframe at a third connection point and a second subframe engagement feature connected to the subframe at a fourth connection point, wherein the third and fourth connection points are provided laterally inboard of the first and second connection points and whereby said body bridges said subframe and said bumper beam and protects said front end module.

2. The protection device of claim 1, wherein said body includes a U-shaped section having said first bumper beam engagement feature at a first end and said second bumper beam engagement feature at a second end.

3. The protection device of claim 2, wherein said U-shaped section includes a first bend, a second bend and an intermediate subsection between said first bend and said second bend.

4. The protection device of claim 3, wherein said body includes a first lug projecting from said U-shaped section adjacent said first bend.

5. The protection device of claim 4, wherein said first lug includes said first subframe engagement feature at a first distal end thereof.

6. The protection device of claim 5, wherein said body includes a second lug projecting from said U-shaped section adjacent said second bend.

7. The protection device of claim 6, wherein said second lug includes said second subframe engagement feature at a second distal end thereof.

8. A protection assembly for a front end module of a motor vehicle, comprising:
- a bumper beam;
- a subframe; and
- a protection device bridging between said bumper beam and said subframe whereby said protection assembly extends at least partially around said front end module.

9. The protection assembly of claim 8, wherein said protection device includes a body having a first bumper beam engagement feature connected to said bumper beam, a second bumper beam engagement feature connected to said bumper beam, a first subframe engagement feature connected to said subframe and a second subframe engagement feature connected to said subframe.

10. The protection assembly of claim 9, wherein said body includes a U-shaped section having said first bumper beam engagement feature at a first end and said second bumper beam engagement feature at a second end.

11. The protection assembly of claim 10, wherein said U-shaped section includes a first bend, a second bend and an intermediate subsection between said first bend and said second bend.

12. The protection assembly of claim 11, wherein said body includes a first lug projecting from said intermediate subsection adjacent said first bend.

13. The protection assembly of claim 12, wherein said first lug includes said first subframe engagement feature at a first distal end thereof.

14. The protection assembly of claim 13, wherein said body includes a second lug projecting from said intermediate subsection adjacent said second bend.

15. The protection assembly of claim 14, wherein said second lug includes said second subframe engagement feature at a second distal end thereof.

16. The protection assembly of claim 15, wherein said subframe includes a first boss engaging said first subframe engagement feature and a second boss engaging said second subframe engagement feature.

17. A method of protecting a front end module of a motor vehicle, comprising:
- shielding said front end module with a protection assembly including a bumper beam, a subframe and a protection device bridging between said bumper beam and said subframe;
- providing two connection points between said bumper beam and said protection device; and
- providing two additional connection points between said subframe and said protection device and laterally inboard said two connection points.

\* \* \* \* \*